United States Patent [19]
Tomida et al.

[11] Patent Number: 5,923,439
[45] Date of Patent: *Jul. 13, 1999

[54] ADJUSTABLE MEMORY CAPACITY FOR PERIPHERAL MULTI-FUNCTION DEVICE

[75] Inventors: Wataru Tomida, Owariasahi; Kazunobu Asai, Nagoya, both of Japan

[73] Assignee: Brother Kogyo Kabushiki Kaisha, Nagoya, Japan

[*] Notice: This patent is subject to a terminal disclaimer.

[21] Appl. No.: 08/856,393

[22] Filed: May 14, 1997

Related U.S. Application Data

[63] Continuation-in-part of application No. 08/420,558, Apr. 12, 1995.

[30] Foreign Application Priority Data

Apr. 28, 1994 [JP] Japan .................................. 6-113579
May 20, 1996 [JP] Japan .................................. 8-124466

[51] Int. Cl.$^6$ ........................................... H04N 1/21
[52] U.S. Cl. ............................................ 358/404; 358/444
[58] Field of Search ................................. 358/404, 444, 358/434, 439, 442, 468, 407, 400, 403, 406; 379/93; 395/164; 364/518, 521; 340/379–800, 747

[56] References Cited

U.S. PATENT DOCUMENTS

| | | | |
|---|---|---|---|
| 4,907,094 | 3/1990 | Mishima et al. | 358/437 |
| 5,068,805 | 11/1991 | Tsuzuki | 395/164 |
| 5,177,620 | 1/1993 | Fukushima | 358/404 |
| 5,359,429 | 10/1994 | Takahashi | 358/439 |
| 5,379,124 | 1/1995 | Ikegaya et al. | 358/440 |
| 5,428,460 | 6/1995 | Kabeya et al. | 358/451 |
| 5,663,805 | 9/1997 | Asai | 358/404 |

FOREIGN PATENT DOCUMENTS

| | | | |
|---|---|---|---|
| A-4-62169 | 2/1992 | Japan | H04N 1/21 |
| A-4-152457 | 5/1992 | Japan | H04N 1/21 |

Primary Examiner—Jose L. Couso
Assistant Examiner—Duy M. Dang
Attorney, Agent, or Firm—Oliff & Berridge, PLC

[57] ABSTRACT

A peripheral multi-function device includes a communication data receiver for receiving communication data through a communication line from a communication device. A recording data receiver receives recording data inputted from an information processing device. A memory includes a communication area for storing the communication data received by receiver and a recording area for storing the recording data received by the recording data receiver. An allocation controller changes an allocation proportion of the memory between the communication area and the recording area.

20 Claims, 6 Drawing Sheets

ADJUSTABLE MEMORY CAPACITY FOR PERIPHERAL MULTI-FUNCTION DEVICE

This application is a continuation-in-part of U.S. patent application Ser. No. 08/420,558, filed Apr. 12, 1995.

BACKGROUND OF THE INVENTION

1. Field of Invention

The invention relates to a peripheral multi-function device that includes a reception mechanism for receiving data through a communication line, a transmission-reception mechanism for transmitting and receiving data to and from an information processing unit, and a memory for storing data received by the reception mechanism and printer data received by the transmission-reception mechanism.

2. Description of Related Art

Recently, performing facsimile communication by using a personal computer, for example by connecting a facsimile device, which includes a facsimile modem, to an information processing unit such as a personal computer, has become popular.

Generally, a facsimile device ("FAX") has a FAX data storing memory and a separate printer data storing memory. The FAX data storing memory and printer data storing memory store FAX data and printer data, respectively, which is fed from the personal computer connected to the facsimile device.

However, separately providing a FAX data storing memory and a printer data storing memory increases memory capacity and thus increases costs.

In order to reduce costs, the storage area of memory in the facsimile device can be used for both FAX data and printer data, which minimizes the required memory capacity.

However, the problem arises that the printer data storing memory can ensure only a certain, relatively small capacity. Therefore the processing speed in recording printer data onto a recording paper is limited.

SUMMARY OF THE INVENTION

It is an object of the invention to provide a peripheral multi-function device that uses a memory for both storing printer data and storing FAX data, and which can record printer data onto a recording paper at a higher speed.

A peripheral multi-function device in accordance with a first aspect of the invention includes a reception mechanism for receiving data through a communication line, a transmission-reception mechanism for transmitting and receiving data to and from an information processing unit, a memory for storing the data received by the reception mechanism and the printer data received by the transmission-reception mechanism, and a capacity expanding mechanism for expanding the memory capacity for storing printer data from a first set value which is used normally to a second set value which uses either a portion or the entire memory capacity for receiving communication data as the memory capacity for storing printer data.

Because a portion or the entire memory capacity for receiving communication data is used as the memory capacity for storing printer data, it is possible to ensure a larger memory capacity for storing printer data than in conventional devices. Therefore, it is possible to record printer data onto a recording paper at a higher speed.

The information processing unit can be a personal computer. The peripheral multi-function device can have a facsimile function, printer function, copying function, scanner function and can operate as a telephone set with an answering system. The invention also covers devices that have one or more of the above described functions, and which are connected, by wire or wireless, for use as a peripheral multi-function device. The printer data can include text data of documents, images prepared by a word processor or word processor software, image data read by a scanner, and copy data. Data can be transmitted and received by wire or wireless. The memory can be implemented via a RAM. The capacity expanding mechanism uses a CPU to execute a predetermined program.

A peripheral multi-function device in accordance with a second aspect of the invention includes the device of the first aspect, and wherein the capacity expanding mechanism expands the memory capacity of the memory mechanism when a user switches to a capacity expanding mode which permits printer data to be stored at the second set value and when the transmission-reception mechanism has received a request for recording.

In addition to the advantages attained by the first aspect of the peripheral multi-function device, the second aspect attains the added benefit that even if the mode has been changed to a capacity expanding mode capable of storing printer data at the second set value, it is possible to receive, as usual, communication data fed through the communication line unless a request for recording is made.

A peripheral multi-function device in accordance with an embodiment and a third aspect of the invention includes the first and second aspects of the device, and wherein the reception mechanism does not receive data when the memory capacity for storing printer data is set to the second set value by the capacity expanding mechanism.

In addition to the advantages attained by the first and second aspects of the device, the third aspect attains the added benefit that when the mode is changed to a capacity expanding mode capable of storing printer data at the second set value and when a request for recording has been made, it is possible to ensure a larger printer data storing capacity of the memory mechanism. Thus, printer data receives complete priority and communication data cannot be sent to the device. This avoids charges for unsuccessful communications, i.e., wherein only a portion of the data is transmitted and successfully received.

A peripheral multi-function device in accordance with another embodiment and a fourth aspect of the invention includes the first and second aspects of the device, and wherein the reception mechanism receives data even when the memory capacity for storing printer data is set to the second value by the capacity expanding mechanism.

In addition to the advantages attained by the first and the second aspects of the device, the fourth aspect attains the added benefit that communication data can be received even when printer data is recorded on recording paper if the volume of the communication data is small, for example if it corresponds to several pages of the recording paper.

A peripheral multi-function device in accordance with a fifth aspect includes the first, second, third and fourth aspects of the device, and further includes a switch for switching the memory capacity for storing printer data from the second set value to the first set value when recording another printer data is not requested within a predetermined time after the end of one printer data, is recorded onto recording paper.

In addition to the advantages attained by the first, second, third and fourth aspects of the device, the fifth aspect attains the added benefit of avoiding problems caused by holding the memory capacity for storing printer data at the second set value for a longer time than necessary, for example failure to receive communication data and resulting reception error.

The above described switching mechanism is obtained by using a CPU to execute a predetermined program.

In accordance with a sixth aspect of the invention, a storage medium operates a peripheral multi-function device that includes a reception mechanism for receiving data through a communication line, a transmission-reception mechanism for transmitting and receiving data to and from an information processing unit, and a memory for storing the data received by the reception mechanism and printer data received by the transmission-reception mechanism. The storage medium stores a capacity expansion program for expanding the memory capacity for storing printer data, out of memory capacities of the memory mechanism, from a first set value which is normally used to a second set value which uses a portion or the entire memory capacity for receiving communication data as the memory capacity for storing printer data.

By installing the contents of this storage medium in an information processing unit, it is possible to obtain the effect of the peripheral multi-function device described in accordance with the first aspect of the invention.

The storage medium can be a flexible disk, provided no limitation is made thereto. For example, the storage medium can be a CD-ROM.

DETAILED DESCRIPTION OF A PREFERRED EMBODIMENTS

A preferred embodiment of the invention is described in detail below with reference to the accompanying drawings.

Figure 1:
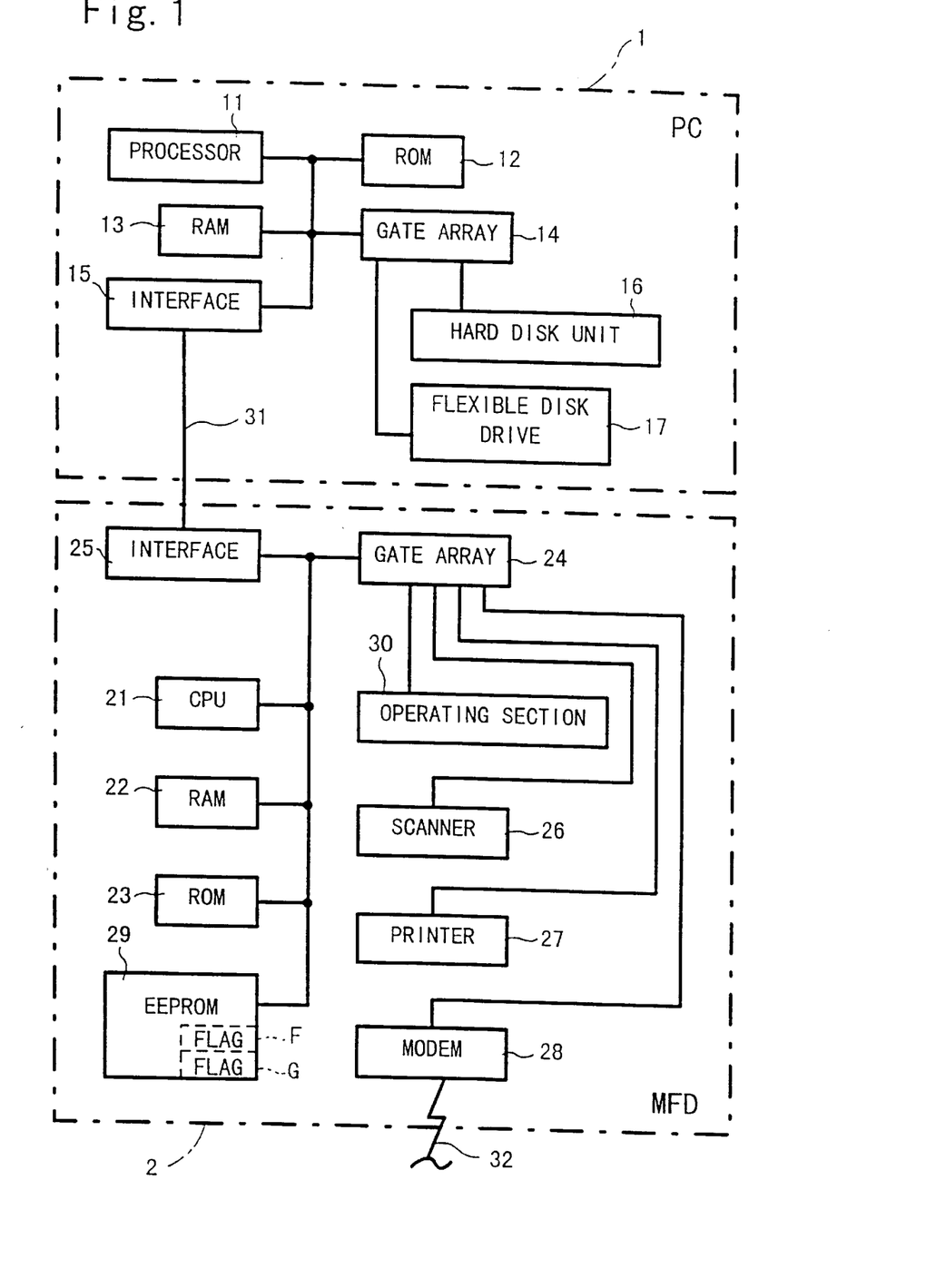
FIG. 1 is a block diagram showing circuits of a peripheral multi-function device in accordance with the invention connected to a personal computer which is an information processing unit.

FIG. 1 is a block diagram showing circuits of a peripheral multi-function device in accordance with the invention connected to a personal computer which is an information processing unit. The personal computer 1 adopts a GUI (Graphical User Interface) using what is called multi-window to permit multiple applications to be kept in operation simultaneously. The peripheral multifunction device 2 ("MFD") has multiple functions, such as the functions of a facsimile, printer, image scanner and copying machine.

The personal computer 1 is provided with processor 11, ROM 12, RAM 13, gate array 14, interface 15, hard disk unit 16, and flexible disk drive 17. The processor 11, ROM 12, RAM 13, gate array 14 and interface 15 are interconnected by a bus trunk. The bus trunk includes data bus, address bus, and control signal line.

The processor 11 operates and performs information processing in accordance with programs installed in the hard disk unit 16 such as an operating system ("OS") and various application software programs. The ROM 12 stores various data. The RAM 13, which stores various data, is utilized by various application software programs. The gate array 14 functions as an interface between the processor 11 and the hard disk unit 16 as well as the flexible disk drive 17. The interface 15 controls the transmission and reception of data between the personal computer 1 and the MFD 2 in accordance with a standard, e.g. RS-232C. The hard disk unit 16 stores various application software programs. The flexible disk drive 17 reads the contents of a flexible disk.

The MFD 2 is provided with CPU 21, RAM 22, ROM 23, gate array 24, interface 25, scanner 26, printer 27, modem 28, EEPROM 29, and operating section 30. The CPU 21, RAM 22, ROM 23, gate array 24, interface 25 and EEPROM 29 are interconnected by a bus trunk. The bus trunk includes data bus, address bus, and control signal line. The interface 25 is connected to the interface 15 of the personal computer 1 trough cable 31. A telephone line 32 is connected to the modem 28.

The CPU 21 controls the whole of the MFD 2. The RAM 22 stores various data. The ROM 23 stores programs for controlling the MFD 2. The gate array 24 functions as an interface between the CPU 21 and the scanner 26, printer 27, modem 28. The interface 25 controls the transmission and reception of data between the personal computer 1 and the MFD 2 in accordance with a standard, e.g. RS-232C. The scanner 26 reads an original image and converts it into an image signal. The printer 27 is a type of laser printer and prints the image on the basis of the image data. In the transmission and reception of data in facsimile communication, the modem 28 modulates a carrier wave in accordance with transmission data, demodulates a received carrier wave and takes out received data. The EEPROM 29 stores cataloged data such as one-touch dialing and abbreviated dialing, as well as flags. The operating section 30, which comprises key switches, outputs an operation signal in accordance with an operation performed by the user.

In the hard disk unit 16 of the personal computer 1 are installed MFD 2 controlling application software programs for realizing various functions such as facsimile communication between the personal computer 1 and another facsimile device, using the modem 28 of the MFD, printing of documents and images prepared by the personal computer 1, using the printer 27, and fetching of an image signal read by the scanner 26 into the personal computer 1. The MFD controlling application software programs are installed in the hard disk unit 16 by inserting a flexible disk into the flexible disk drive 17 and performing a predetermined operation. The application software programs comprise software called FAX driver which executes data conversion such as the conversion of text data into bit map data, software called log manager which manages and displays a communication history, and software called status monitor which manages the transmission and reception of data between the personal computer 1 and the MFD 2. In accordance with the operating system stored in the hard disk unit 16, the processor 11 reads these application software programs and operates according to the application software program.

Thus, the CPU 21, interface 25 and cable 31 constitute a transmission-reception mechanism for transmitting and receiving data between the information processing unit and the peripheral multi-function device. The RAM 22 constitutes a memory for storing both received communication data and printer data received by the transmission-reception mechanism. The CPU 21 constitutes a capacity expanding mechanism for expanding the memory capacity for storing printer data from a first set value to a second set value which uses a portion of the entire memory capacity for receiving communication data as the memory capacity for the storage of printer data. The CPU 21 also constitutes a switching mechanism for switching the memory capacity for storing printer data from the second set value to the first set value when no request is made for recording another printer data within a predetermined time after one printer data is finished recording onto recording paper.

Figure 2:
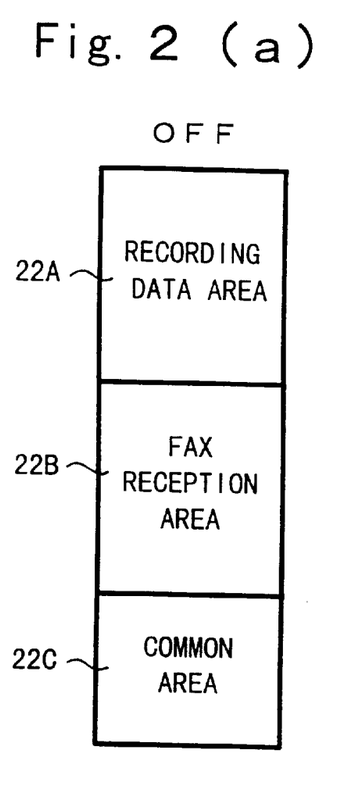
FIGS. 2(a) and 2(b) are schematics showing storage areas of a RAM used in the peripheral multi-function device of FIG. 1.

FIG. 2 is a schematic showing storage areas of the RAM 22 in the MFD 2. The storage areas include a recording data area 22a for storing recording data to be recorded on recording paper such as, for example, printer data to be recorded on recording paper and FAX data to be transmitted by facsimile, a FAX reception area 22b for storing data received by facsimile, and a common area 22c for storing various other data. FIG. 2(a) shows a situation in which the memory capacity of the recording data area 22a is at the first set value, while FIG. 2(b) shows a situation in which the memory capacity of the area 22a is at the second set value.

The recording data area 22a normally stores recording data at a memory capacity of the first set value, as shown in FIG. 2(a). However, when the capacity mode has been switched by the user to the expansion mode capable of storing recording data at the second set value and when the transmission-reception mechanism has received a request for recording, the recording data storage area 22a is expanded, as shown in FIG. 2(b), by using a portion or the entire FAX reception area 22b as a recording data area.

The operation of the peripheral multi-function device is described below. First, the CPU 21 judges whether a user has depressed a priority mode key provided in the operating section 30 of the multifunction device. If the answer is affirmative, a flag F is set to 1 and is stored in the EEPROM 29. Next, when the user requests the CPU 21 for recording by operating a key switch in the operating section 30, the CPU 21 judges whether the flag F stored in the EEPROM 29 is 1. If the answer is affirmative, the CPU 21 expands the memory capacity for storing printer data by using a portion or the entire memory capacity for receiving FAX data in the RAM 22 as the memory capacity for the storing printer data.

Figure 3:
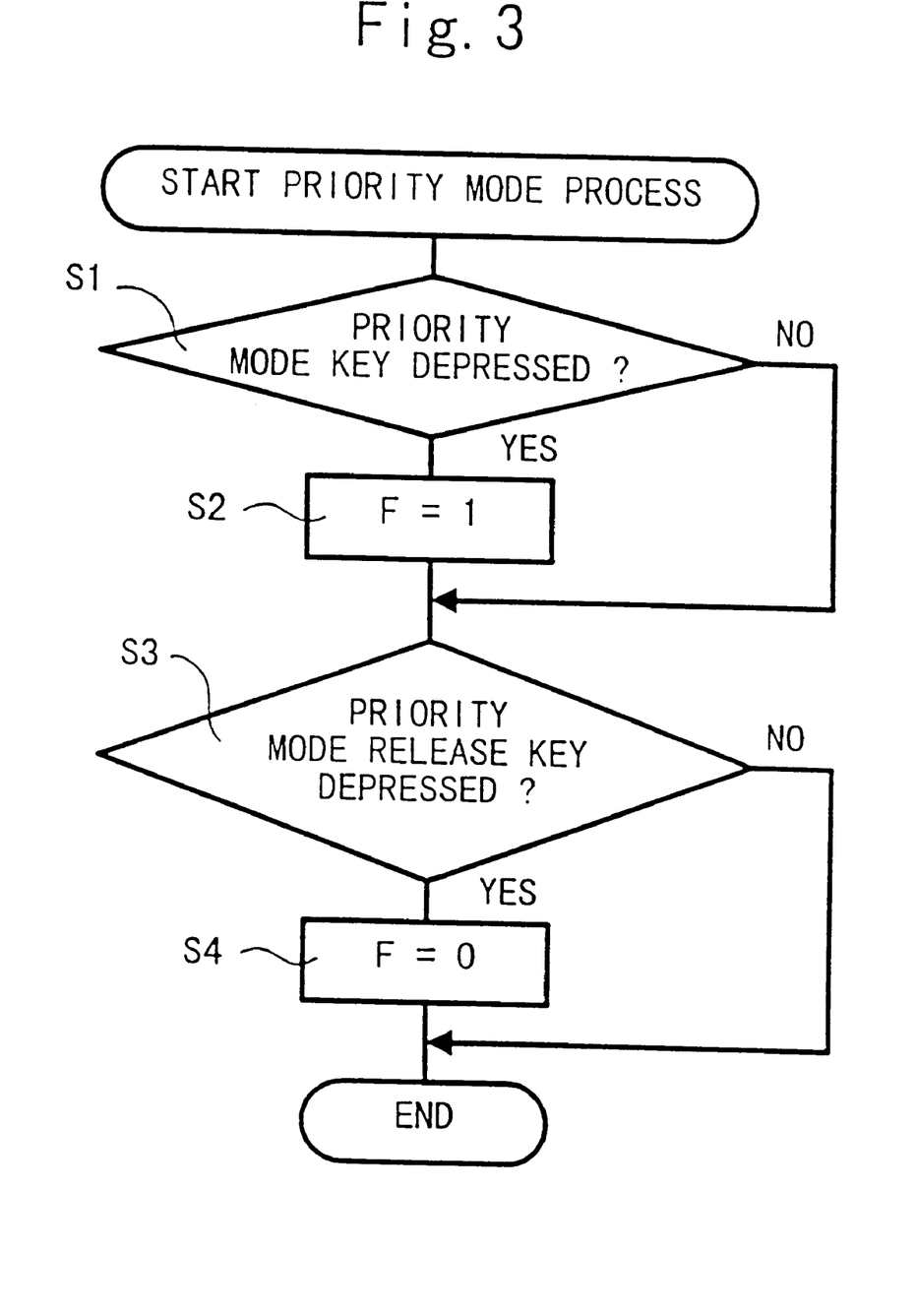
FIG. 3 is a flow chart showing a priority mode processing procedure performed by the peripheral multi-function device of FIG. 1.

Now, the priority mode processing procedure is described with reference to the flow chart of FIG. 3.

First, the CPU 21 judges whether a user has depressed the priority mode key provided in the operating section 30 of the MFD 2 (S1). If the user is affirmative (S1:YES), the flag F is set to 1 and is stored in the EEPROM 29 (S2). However, if the answer is negative (S1:NO), the flag F is left as it is stored in the EEPROM 29, i.e., F=0, without rewriting.

Then, the CPU 21 judges whether a user has depressed a priority mode release key provided in the operating section 30 of the MFD 2 (S3). If the answer is affirmative (S3:YES), the flag F is set to 0 and is stored in the EEPROM 29 (S4). Now, this routine is ended. On the other hand, if the CPU 21 judges that the priority mode release key has not been depressed (S3:NO), this routine is ended without rewriting the flag F.

A single switch can be used for the priority mode key and the priority mode release key, wherein the single key switch is turned on and off for selection between priority mode and priority mode release. Alternatively, both keys may be provided separately. In the former case, that is, in the case of using a single key switch, it is desirable to display the priority mode and priority mode release.

Figure 4:
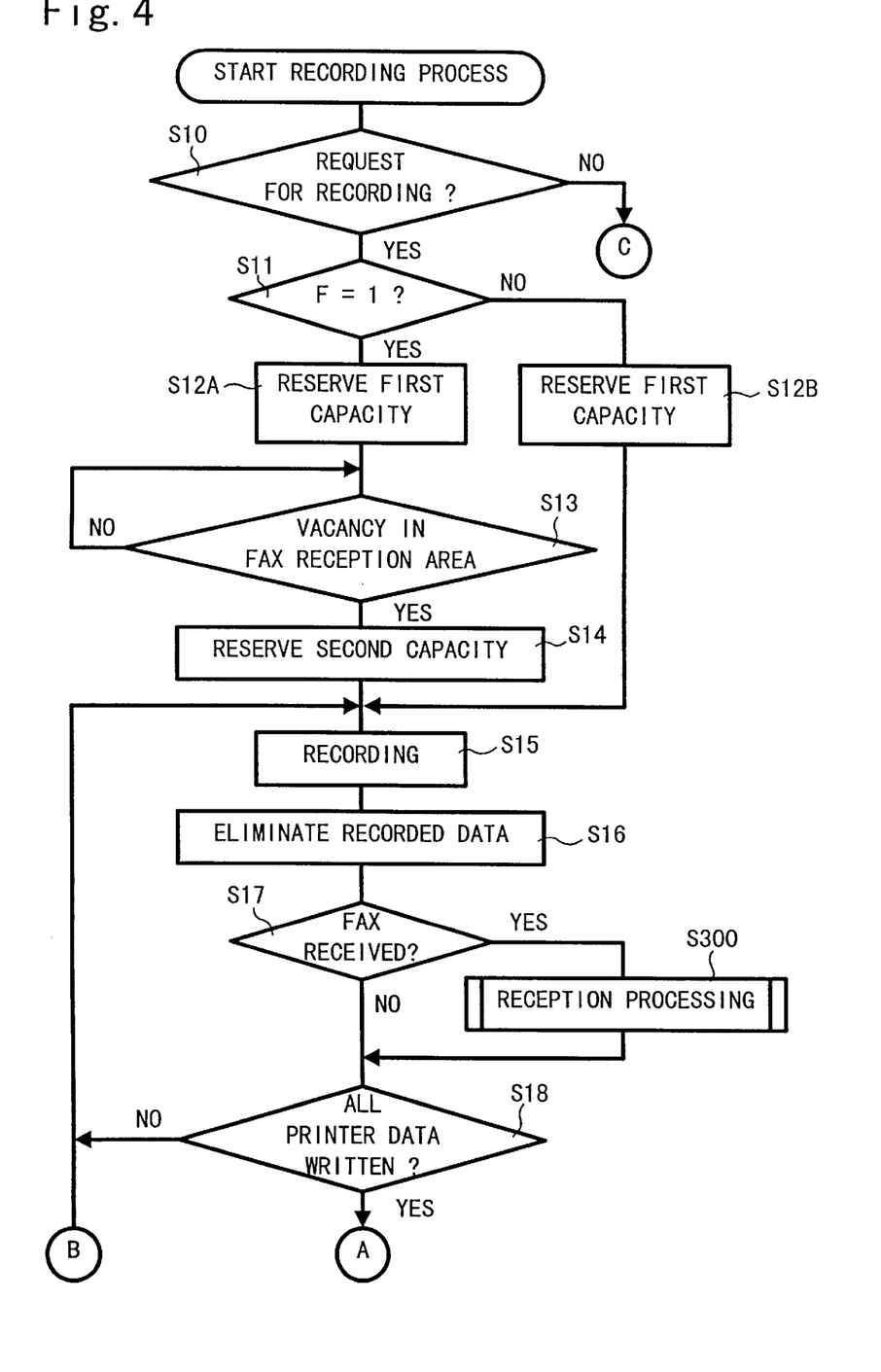
FIG. 4 is a flow chart showing a printer data recording processing procedure performed by the peripheral multi-function device of FIG. 1.
Figure 5:
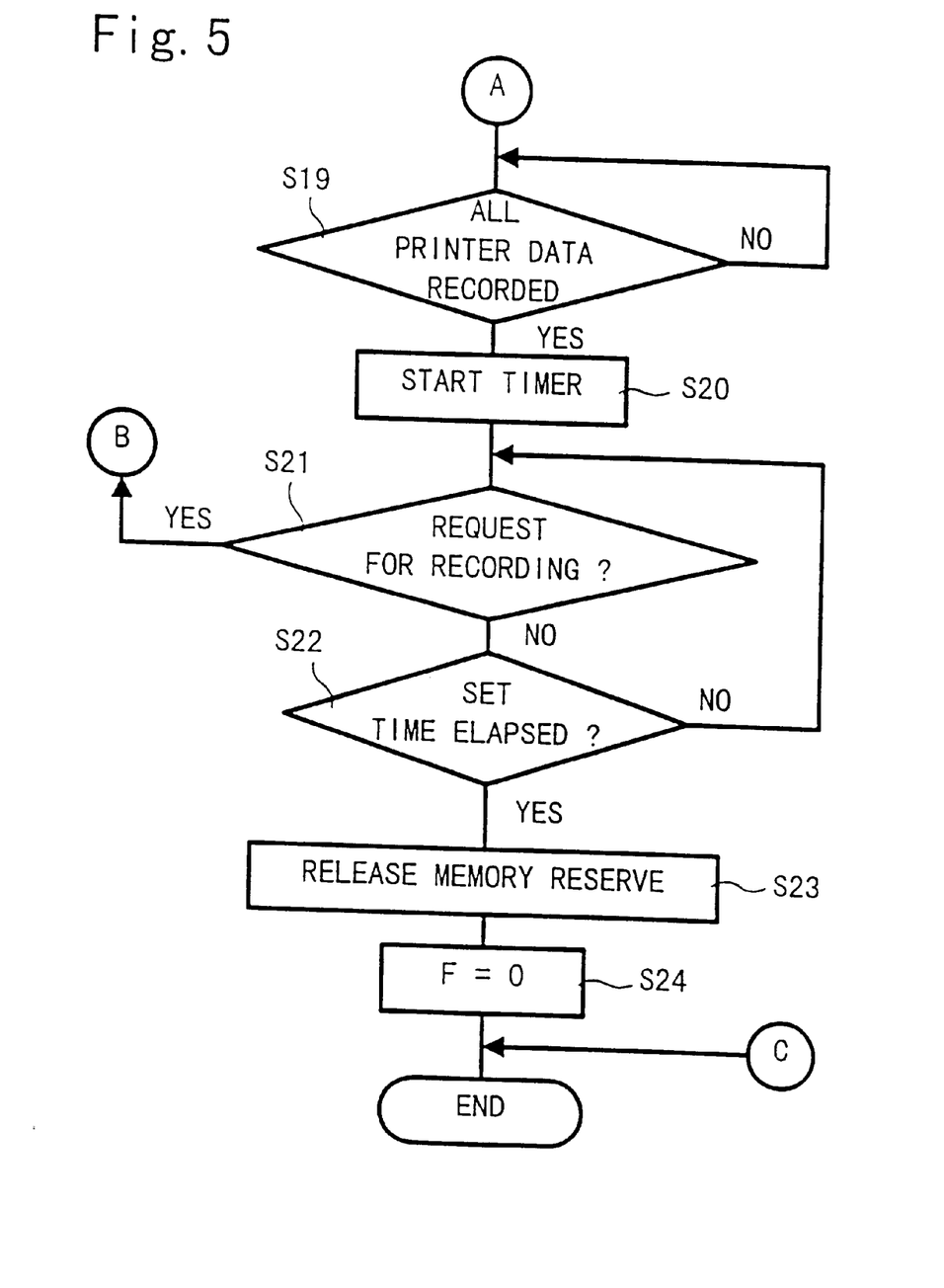
FIG. 5 is a flow chart also showing the printer data recording processing procedure performed by the peripheral multi-function device of FIG. 1.

Now, with reference to the flow charts of FIGS. 4 and 5, the following description is provided regarding the recording processing procedure in the peripheral multi-function device having the priority mode.

First, the CPU 21 judges whether a request for recording has been inputted from the personal computer 1 (S10). If the answer is affirmative (S10:YES), the CPU 21 judges whether the flag F stored in the EEPROM 29 is 1 (S11).

If the answer is affirmative (S11:YES), the CPU 21 reserves the capacity of the first set value for the printer data area 22a in the RAM 22, and assigns it to an input buffer for temporarily storing the printer data inputted from the personal computer 1 (S12A).

In accordance with this embodiment, the CPU 21 stores the inputted printer data by time sharing related with the other processes (ex. recording process) into the memory area assigned as the input buffer in the printer data area 22a. Alternatively, the processing of storing the inputted printer data can be executed by an interrupt control of the CPU 21.

Then, the CPU 21 judges whether there is enough vacancy in the FAX reception area 22b to make it possible to expand the memory capacity of the printer data area 22a to the capacity of the second set value (S13).

If the CPU 21 judges that there is not enough vacancy in the FAX reception area 22b (S13:NO), the CPU 21 repeats the judgment at step S13 until there is enough vacancy in the FAX reception area 22b. Such a vacancy will occur when FAX data stored in the FAX reception area 22b has been recorded on the recording paper by the printer 27 and eliminated from the FAX reception area 22b thereafter. The CPU 21 executes the above-mentioned recording and elimination of the FAX data by time sharing related with the other processes.

On the other hand, if the answer is affirmative (S13: YES), the CPU 21 expands the memory capacity for the printer data area 22a by reserving part of the FAX reception area 22b in the RAM 22 as the printer data area 22a. The CPU 21 also assigns the expanded printer data area to memory areas for storing the inputted printer data and converted printer data which is generated by converting the inputted printer data into data applicable to the recording operation of the printer 27 (S14).

In accordance with this aspect, a portion of the memory area for receiving FAX data in the RAM 22 is reserved as the memory area for storing printer data. Also, as to the memory area for receiving FAX data, a predetermined memory capacity is reserved. Preferably, the predetermined memory capacity for receiving FAX data is a memory capacity which permits one to several pages of FAX data to be stored.

Then, the CPU 21 converts inputted printer data into the converted printer data and stores it successively into the printer data area 22a. The CPU 21 controls the printer 27 to execute the recording on a recording paper based upon the printer data stored in the printer data area 22a of the RAM 22 (S15). The printer 27 successively records one page of the printer data as one unit since it is a type of page printer, i.e., laser printer.

Since enough capacity of printer data area 22a is reserved at step S14 for the recording operation of step S15, the printer data can be converted reliably and easily to make it applicable to the printer 27 even if printer data of a complicated image is inputted from the personal computer 1.

On the other hand, when the CPU 21 judges that the flag F stored in the EEPROM 29 is not 1, in other words, the flag F is 0 (S11: NO), the CPU 21 reserves the capacity of the first set value for the printer data area 22a in the RAM 22. The CPU 21 assigns it both to the input buffer for temporarily storing the printer data inputted from the personal computer 1 and to the memory area for storing the printer data converted applicably for the printer 27 (S12B).

Then, the printer data is stored. The CPU 21 converts inputted printer data into the converted printer data and stores it successively into the printer data area 22a and records it on the recording paper by the printer 27 in the same manner as the above-mentioned step S15.

Then, the printer data which has been recorded on the recording paper is eliminated from the printer data area 22a successively (S16).

Then, the CPU 21 judges whether FAX data has been received (S17). The CPU 21 executes the judgment of step S17 by checking the status of a flag G, which is set to 1 by the CPU 21 when any FAX communication is received. That is, the CPU 21 monitors whether any FAX communication is received by time sharing related with the recording process. If the answer is affirmative (S17: YES), a reception process is performed, as described below (S300).

If the CPU 21 judges in step S17 that FAX data has not been received (S17:NO), and when the reception process is over, the CPU 21 judges whether all the printer data to be recorded onto the recording paper has been converted and written into the printer data area 22a in the RAM 22 (S18).

If the answer is affirmative (S18: YES), the CPU 21 judges whether all the printer data to be recorded has been recorded on the recording paper (S19). On the other hand, if the answer at step S18 is negative (S18: NO), the processing flow returns to step S15 to store another converted printer data and records it in the same manner s described above.

If the CPU 21 judges in step S19 that recording of all the printer data to be recorded stored in the printer data area 22a has not been completed yet (S19: NO), the same judgment of step S19 is repeated until the CPU 21 judges that all the printer data to be recorded has been recorded on the recording paper.

When the CPU 21 judges in the step S19 that all the printer data to be recorded has been recorded onto the recording paper (S19:YES), a timer is started (S20) and the CPU 21 again judges whether another request for recording has been inputted from the personal computer 1 (S21).

If the answer is affirmative (S21: YES), the processing flow returns to step S15 to store another converted printer data and records it in the same manner as described above. On the other hand, if the CPU 21 judges that a request for another recording has not been inputted (S21: NO), the CPU 21 monitors the timer to judge whether the time set in the timer has elapsed (S22).

If the answer is negative (S22:NO), the processing flow returns to step S21, in which the above judgment is repeated until the CPU 21 judges that a request for recording has been inputted or that the time set in the timer had elapsed.

If the CPU 21 judges in step S22 that the set time has elapsed (S22:YES), the reserved memory capacity for expansion of the printer data area 22a is released to the FAX reception area (S23), the flag F is reset to 0 in the EEPROM 29 (S24). Now, this routine is ended.

If the CPU 21 judges in step S10 that the request for another recording printer data has not been made (S10:NO), it follows that printer data is not to be recorded on the recording paper, and therefore this routine is ended.

Figure 6:
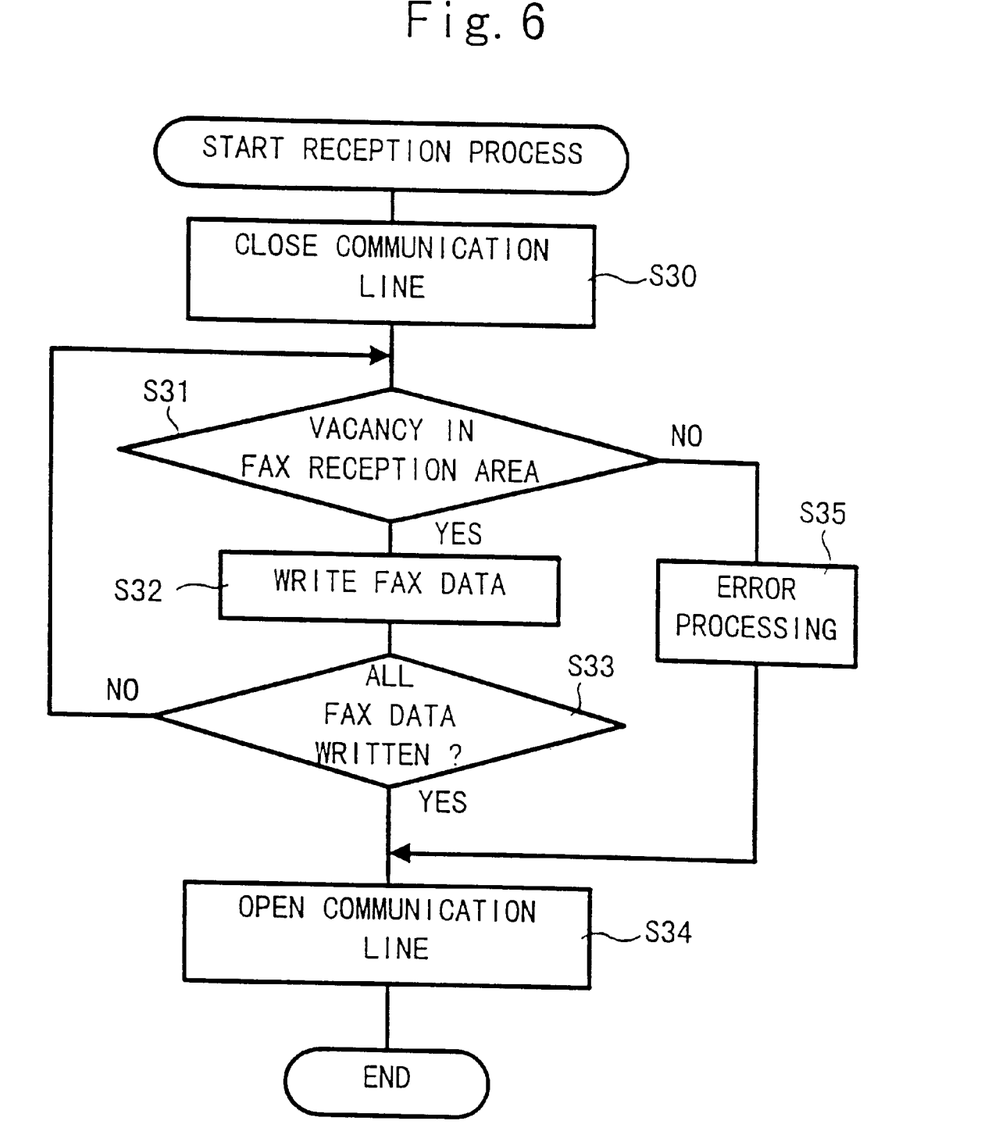
FIG. 6 is a flow chart showing a FAX reception processing procedure performed during the recording processing of FIG. 4.

Now, the reception processing procedure in step S24 shown in FIG. 4 is described below with reference to the flow chart of FIG. 6.

Upon receipt of FAX data, the CPU 21 closes the communication line (S30) and judges whether there is a vacancy in the FAX reception area 22b of the RAM 22 (S31).

If the answer is affirmative (S31: YES), FAX data is written to the FAX reception area 22b (S32).

Next, the CPU 21 judges whether the writing of FAX data to the FAX reception area 22b is completed (S33), and if the answer is affirmative (S33:YES), the CPU 21 opens the communication line (S34) and ends this routine.

If the CPU 21 judges in step 31 that there is no vacancy in the FAX reception area 22b of the RAM 22 (S31:NO), that is, if it is judged that storing FAX data is no longer feasible, a reception error processing is performed (S35).

If the CPU 21 judges in step S33 that the writing of FAX data to the FAX reception area 22b has not been completed (S33:NO), the process returns to step S31. Therefore, the writing of FAX data is continued until the writing of FAX data is completed or until there is no longer any vacancy in the FAX reception area 22b.

As described above, a portion of the memory capacity for receiving FAX data in the RAM 22 is reserved as the memory capacity for storing printer data. Also, as to the memory capacity for receiving FAX data, a predetermined capacity is reserved. Alternatively, the entire memory capacity for receiving FAX data may be used as the memory capacity for storing printer data to inhibit the receipt of FAX data during the recording of printer data by changing the recording process of FIG. 4 as follows. The CPU 21 expands the memory capacity for the printer data area 22a by reserving all of the FAX reception area 22b in the RAM 22 as the printer data area 22a at step S14, and the operations of steps S17 and S24 are eliminated.

Still further, each of the processes described above may be performed wherein a flexible disc, in which the program for executing each processing is stored, is set into a flexible disc drive 17 to install the program into the hard disc device 16, so that the processing is performed as an application software.

What is claimed is:

1. A peripheral multi-function device comprising:
    a communication data receiver for receiving communication data through a communication line from a communication device;
    a recording data receiver for receiving recording data inputted from an information processing device;
    a memory including a communication area for storing the communication data received by said receiver and a recording area for storing the recording data received by said recording data receiver; and
    an allocation controller changing an allocation proportion of the memory between the communication area and the recording area.

2. The peripheral multi-function device according to claim 1, wherein said allocation controller includes an expansion controller for expanding a capacity of the recording area from a first predetermined value to a second predetermined value by allocating a portion or an entire communication area to the recording area.

3. The peripheral multi-function device according to claim 2, wherein said allocation controller further includes an expansion mode setter for setting an expansion mode and the expansion controller expands the recording area by allocating a portion or the entire communication area to the recording area when the recording data is inputted from the information processing device on such a condition that the expansion mode is set by said expansion mode setter.

4. The peripheral multi-function device according to claim 2, wherein the first predetermined value is at least the capacity allocated to the recording area.

5. The peripheral multi-function device according to claim 2, wherein the expansion controller expands the capacity of the recording area from the first predetermined value to the second predetermined value by allocating the entire communication area to the recording area and said communication data receiver does not receive communication data when the capacity of the second predetermined value is allocated to the recording area by the expansion controller.

6. The peripheral multi-function device according to claim 2, wherein the expansion controller expands the capacity of the recording area from the first predetermined value to the second predetermined value by allocating only a portion of the communication area to the recording area and said communication data receiver receives communication data even if the capacity of the second predetermined value is allocated to the recording area by the expansion controller.

7. The peripheral multi-function device according to claim 2, wherein said allocation controller further includes a reset controller for resetting the capacity of the recording area from the second predetermined value to the first predetermined value by allocating the expanded part of the recording area to the communication area when a request for recording another recording data is not inputted within a predetermined time after certain printer data is finished recording.

8. A peripheral multi-function device, comprising:
communication data receiver means for receiving communication data through a communication line from a communication device;
recording data receiver means for receiving recording data inputted from an information processing device;
memory means including a communication area for storing the communication data received by said communication data receiver means and a recording area for storing the recording data received by said recording data receiver means; and
allocation control means for changing an allocation proportion of the memory means between the communication area and the recording area.

9. The peripheral multi-function device according to claim 8, wherein said allocation control means includes expansion control means for expanding a capacity of the recording area from a first predetermined value to a second predetermined value by allocating a portion or an entire communication area to the recording area.

10. The peripheral multi-function device according to claim 9, wherein said allocation control means further includes expansion mode setter means for setting an expansion an expansion mode and the expansion control means expands the recording area by allocating a portion or the entire communication area to the recording area when the recording data is inputted from the information processing device on such a condition that the expansion mode is set by said expansion mode setter means.

11. The peripheral multi-function device according to claim 9, wherein the first predetermined value is at least the capacity allocated to the recording area.

12. The peripheral multi-function device according to claim 9, wherein the expansion control means expands the capacity of the recording area from the first predetermined value to the second predetermined value by allocating the entire communication area to the recording area and said communication data receiver means does not receive communication data when the capacity of the second predetermined value is allocated to the recording area by the expansion control means.

13. The peripheral multi-function device according to claim 9, wherein the expansion control means expands the capacity of the recording area from the first predetermined value to the second predetermined value by allocating only a portion of the communication area to the recording area and said communication data receiver means receives communication data even if the capacity of the second predetermined value is allocated to the recording area by the expansion control means.

14. The peripheral multi-function device according to claim 9, wherein said allocation control means further includes reset control means for resetting the capacity of the recording area from the second predetermined value to the first predetermined value by allocating the expanded part of the recording area to the communication area when a request for recording another recording data is not inputted within a predetermined time after certain printer data is finished recording.

15. A method of allocating memory within a peripheral multi-function device comprising the steps of:
receiving communication data through a communication line from a communication device with a communication data receiver;
receiving recording data inputted from an information processing device with a recording data receiver;
storing the communication data received by said communication data receiver in a communication area of the memory;
storing the recording data received by said recording data receiver in a recording area of the memory; and
changing an allocation proportion of the memory between the communication area and the recording area with an allocation controller.

16. The method according to claim 15, further including the step of expanding a capacity of the recording area from a first predetermined value to a second predetermined value by allocating a portion or an entire communication area to the recording area with an expansion controller.

17. The method according to claim 16, further including the step of setting an expansion mode with an expansion mode setter, and the expansion controller expands the recording area by allocating a portion or the entire communication area to the recording area when the recording data is inputted from the information processing device on such a condition that the expansion mode is set by the expansion mode setter.

18. A storage medium for operating a peripheral multi-function device to store received data into a memory, comprising:
a communication data receiver program for receiving communication data through a communication line from a communication device;
a recording data receiver program for receiving recording data inputted from an information processing device;

a communication data storing program for storing the communication data received by said communication data receiver program into a communication area of the memory;

a recording data storing program for storing the recording data received by said recording data receiver program into a recording area of the memory; and an allocation control program for changing an allocation proportion of the memory between the communication area and the recording area.

19. The storage medium according to claim 18, wherein said allocation control program includes an expansion control program for expanding a capacity of the recording area from a first predetermined value to a second predetermined value by allocating a portion or an entire communication area to the recording area.

20. The storage medium according to claim 19, further including an expansion mode setter program for setting an expansion mode, and the expansion control program expands the recording area by allocating a portion or the entire communication area to the recording area when the recording data is inputted from the information processing device on such a condition that the expansion mode is set by the expansion mode setter program.

* * * * *